Dec. 22, 1959   E. WILDHABER   2,917,911
UNIVERSAL JOINT

Filed Feb. 13, 1957   3 Sheets-Sheet 1

INVENTOR:

Ernest Wildhaber

Dec. 22, 1959 — E. WILDHABER — 2,917,911
UNIVERSAL JOINT
Filed Feb. 13, 1957 — 3 Sheets-Sheet 2

INVENTOR:
Ernest Wildhaber

United States Patent Office 2,917,911
Patented Dec. 22, 1959

2,917,911

UNIVERSAL JOINT

Ernest Wildhaber, Brighton, N.Y.

Application February 13, 1957, Serial No. 639,942

16 Claims. (Cl. 64—21)

The present invention relates to universal joints for transmitting torque between two members having axes intersecting at an angle which may vary in operation, and particularly to the type known as constant velocity universal joints. Here constant velocity is transmitted regardless of said angle. Particularly it relates to universal joints in which rotatable parts transmit the torque between said two members, and in which control means maintain the centers of said parts in the plane bisecting the angle between said axes and passing through their intersection point. This plane will be referred to as the bisector plane hereafter. The rotatable parts may be rollers, balls or sliding blocks.

More specifically the invention refers to universal joints of the said character, in which said two members are an inner member carrying said rotatable parts, and an outer member surrounding and enclosing said parts and containing straight ways parallel to its axis, for engagement with said parts. In such joints the control means ordinarily interlace so much that assembly or dissembly is time-consuming or difficult without additional structure to this end.

One object of the present invention is to devise control means that facilitate rapid assembly and dissembly, and that do not require such additional structure.

A further object of the present invention is to devise a constant velocity universal joint of this kind, having an outer member provided internally with straight ways, that permits free displacement along the axis of said outer member, within design limits, and whose control means keep on functioning correctly regardless of such displacement.

A still other aim is to devise control means that are exact and not merely approximate and that have low control pressures.

Another object is to attain a constant velocity universal joint of high load capacity and low cost.

In the Hotchkiss drive for automobiles and trucks the propeller shaft contains two spaced universal joints, of which one is adjacent the rear axle. The propeller shaft also contains sliding splines to permit the distance between said joints to vary and to adjust itself to working conditions. Because of high static friction such adjustment may occur suddenly with a jerk. Also the universal joint adjacent the rear axle is occasionally subjected briefly to relatively large angularities, at which the transmitted motion is subjected to periodic fluctuations felt as kicks.

A further object of the invention is to do away with the kicks as well as the jerks, by substituting my new constant velocity universal joint for the conventional joint now in use.

A still other object is to devise an improved universal joint having a forked member on which is pivoted a holder with a pair of coaxial rollers, and having an outer member enclosing said rollers and fork member and containing internal ways parallel to its axis, for engagement with said rollers.

Other objects will appear in the course of the specification and in the recital of the appended claims.

Figure 1:
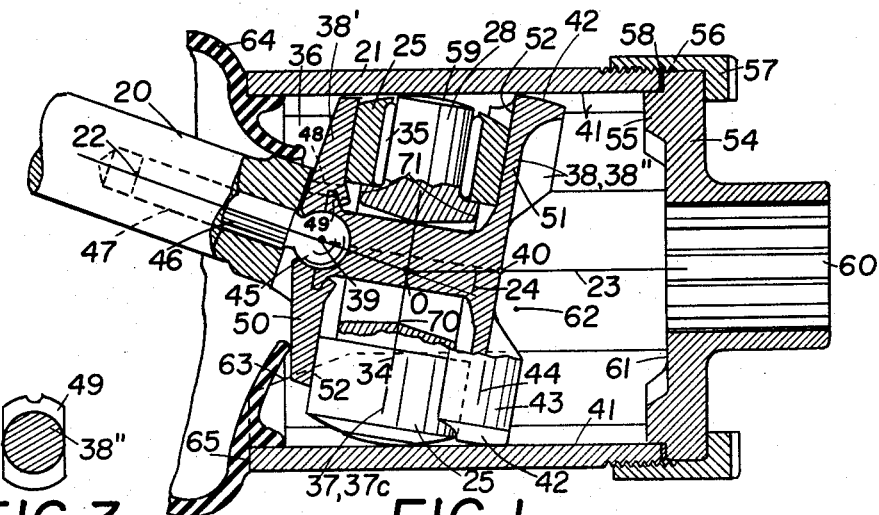
Fig. 1 is an axial section of a universal joint constructed according to the present invention, and showing the joint at its maximum angularity.
Figure 5:
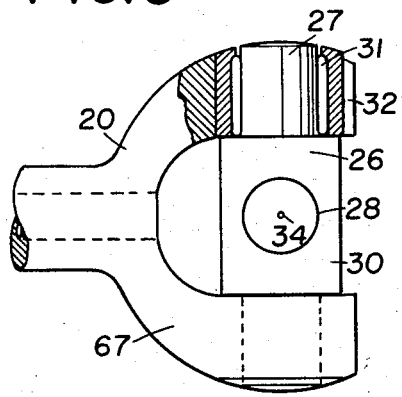
Fig. 5 is a side view taken at right angles to the side view of Fig. 4, and showing the fork, and also the spider member.
Figure 2:
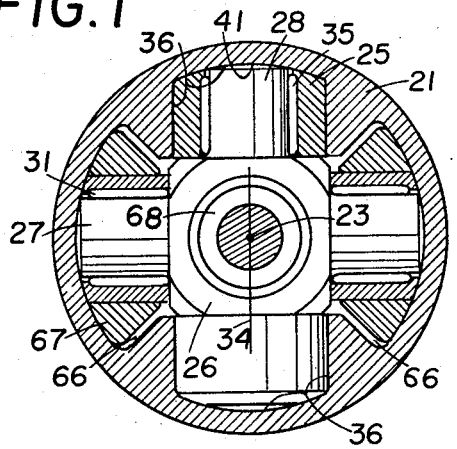
Fig. 2 is a cross-section corresponding to Fig. 1, but showing the universal joint at zero angularity, in axial alignment.
Figure 4:
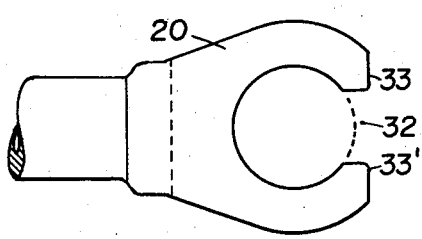
Fig. 4 is a side view of the forked member shown in the same turning position as in Fig. 1.

The universal joint shown in Figures 1 and 2 serves to transmit torque between two members 20, 21, having axes 22, 23 respectively. These include an angle 24 with each other, which may vary in operation. The inner member 20 carries a pair of cylindrical rollers 25 through the medium of a spider 26, best seen in Fig. 2. It contains two pairs of journal portions 27, 28 projecting from a central hub portion 30, each pair being coaxial. Member 20 is forked at one end, Figs. 4 and 5, and pivotally holds the journal portions 27 of spider 26 by means of needle bearings 31. A slot 32 is provided at the outer ends of the forked member 20, for assembly of the spider therein. If desired the ends 33, 33' may be connected by a tie or bolt, after lengthening them.

The other pair 28 of journal portions rotatably mount a pair of cylindrical rollers 25, as by needle bearings 35.

The outer member 21 encloses the rollers 25, the spider 26 and the forked end of member 20. It is an internally grooved member that contains plane-sided ways 36 extending parallel to its axis 23, for engagement with the rollers 25.

As known, constant velocity is transmitted between the two members 20, 21 when the roller centers and their axes 34 are maintained continuously in the plane 37 that passes through the intersection point 0 of the axes 22, 23, and bisects the supplement of angle 24. This bisector plane bisects the angle 180 deg.—angle 24.

The novelty of the invention resides in the use of an axially free outer member 21 together with a fork member 20 and spider pivoted thereon, and especially in the control means for maintaining the centers of the rollers 25, or rotatable parts, in the bisector plane. These control means are in the form of a control element 38 supported at two points 39, 40 so that its axis 39—40 is constrained to pass through said points. Points 39, 40 lie on the axes 22, 23 of the members 20, 21 respectively at equal distances from their intersection point 0. The support at point 40 is effected by a plurality of separated portions of an inside cylindrical surface 41 engaging portions 42 of a convex spherical surface provided on said control element and centered at 40. In other words the opposite cylindrical bottoms of the ways 36 engage the spherical end portions 42 of element 38. This effects radial centering in the drawing plane of Fig. 1. Centering in a direction perpendicular thereto is effected by the contact of cylindrical portions 43 with the plane sides of the ways 36. Centering is thus accomplished through the sides and bottoms of the ways 36.

Portions 43 have a common axis 44 parallel to the roller axis 34 and passing through center 40. And the diameter of cylindrical portions 43 is equal to the diameter of the rollers 25. While portions 43 do not turn about axis 44 like rollers do, they nevertheless complete the elements of a Cardan-type joint with center 40. This joint with center 40 transmits practically no torque, but serves to turn the control element 38 smoothly, without bumps. At the same time it completes the support of element 38 at center 40.

The support at point 39 is effected by the ball end 45 of a rod 46 coaxial with axis 22 and axially slidable in a bore 47 of member 20. The ball end 45 engages a matching internal spherical portion provided at the juncture of the two parts 38′, 38″ of the control element 38. The said two parts are rigidly secured to each other by segmental ring-shaped projections 49 (Figures 1 and 3) of part 38″ that engage matching segmental recesses provided in part 38′. The recesses are shaped to permit assembly in the direction of axis 39—40 when the parts 38′, 38″ are turned ninety degrees about said axis relatively to one another. A pin 48, shown in dotted lines in Fig. 1, secures the turning position, so that the two parts 38′, 38″ are locked together as if in one piece. Any other suitable known way of rigidly connecting parts 38′, 38″ may be used in place of the one shown. How the two parts may be actually made in one piece will be shown hereafter.

Figure 6:
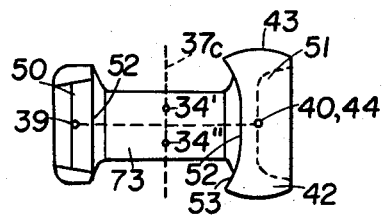
Fig. 6 is a view of the control element 38, 38a taken along the roller axis.
Figure 7:
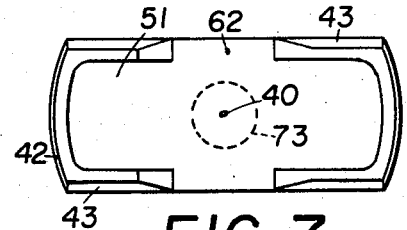
Fig. 7 is an end view of the control element 38, 38a taken from the right of Fig. 6.

As the two supporting points 39, 40 are equally distant from center 0, the axis 39—40 of the control element includes equal angles with the two axes 22, 23, each angle being exactly one half of angle 24. The central plane of rotation of the control element therefore coincides with the aforesaid bisector plane 37. The roller centers and their axis 34 are continuously and accurately maintained in the bisector plane 37 by keeping it in the central plane of the control element 38. To this end arms 50, 51 reach from the central portion of element 38 outwardly towards the rollers 25 and straddle the rollers, to transmit guiding pressure thereto. The required guiding pressure depends on the turning position and increases with increasing angle 24. The arms 50, 51 have opposed plane sides 52 (Figs. 1 and 6) that are parallel to the central plane of rotation 37c and the bisector plane 37, and are perpendicular to the axis 39—40 of the control element 38. The rollers 25 directly contact the plane sides 52 of the arms 50, 51. In operation, the contact sweeps only a limited width of the plane sides 52. The end surfaces 53 (Fig. 6) of the arms may match the cylindrical roller surface in its relative end positions, and be curved about axes 34′, 34″ respectively. This adds to the width of the cylindrical portions 43, as is desired.

The outer member 21 may be rigidly secured to a flange member 54 by means of projections 55 reaching into the ways 36 and contacting their sides, and by means of a sleeve 56 that threads onto member 21. It exerts pressure on flange member 54 through a shoulder 57. A gasket 58 is interposed between the flange member and the end of outer member 21. A splined shaft (not shown) matching the splines 60 may be secured to the flange member in known manner.

Ordinarily constant velocity universal joints of the general character referred to have interlaced central control portions that defy rapid dissembly and assembly for servicing or repair. Only by adding structure, such as for instance a pair of contacting flanges and screws for holding them together, can rapid dissembly and assembly be achieved. The present invention however achieves this without adding parts. The (right) end of the control member 38 contains a gap or recess 62 at the center, opposite the flange member 54. The joint thus can be readily separated in all positions that may occur by turning sleeve 56 until disengaged from the outer member 21, by pulling the member 21 back slightly, to the left in Fig. 1, and by swinging it out together with its contents in the direction of gap 62. The internally grooved outer member 21 further provides an excellent protection against damage as by flying stones, and affords a simple seal.

An important cause for the improvement achieved by the invention are the means that constrain the axis 39—40 of the control element 38 to pass through point 40 of axis 23. These means comprise a plurality of separated portions of an inside cylindrical surface provided on the outer member adjacent the sides of its ways, engaging portions of a convex spherical surface provided on the control element. In the embodiment just described the cylindrical portions 41 are the bottoms of the ways. In an embodiment to be described hereafter they comprise the separated portions of the inside bore of the outer member. This contact of separated portions of a cylindrical surface at or adjacent the straight ways has the further merit of permitting a substantial relative displacement along the axis of the outer member, a property that is very useful in many applications.

It does not exist in a comparable degree where this inside cylindrical surface is the bore of a hub. In the structure shown such axial freedom merely requires a sufficient length of the ways, and provision for the shaft portion of the inner member 20 to clear the ends of the ways, conveniently achieved by a flared end 63, Fig. 1. A constraint through a bore in the hub would further require an axial extension of said bore, and provision for the control means to clear the extended length of said bore.

The outer ends 59 of the journal portions 28 are portions of a spherical surface centered at 0. They contact the cylindrical bottom surface 41 of the ways 36, for centering along axis 34. Together with the working contact at the outside surfaces of the rollers they constrain the axes 22, 23 to intersect at 0, midway between points 39, 40.

A flexible seal 64 is bonded in any suitable known way to the end 65 of outer member 21. Only a portion of the seal is shown. The opposite end of the seal 64 is clamped or otherwise secured in known manner to a shaft portion rigid with or integral with member 20, and not shown.

As seen in Fig. 2, the outer member 21 contains a pair of diametrically opposite slots 66 in addition to the pair of ways 36. The slots 66 are also parallel to the axis 23 of member 21. These slots provide clearance for the arms 67 of the forked member 20. They have preferably a tapering cross-section, increasing in width with increasing distance from the axis 23 of member 21, to leave more space for the arms 67. Thus member 21 contains two pairs of slots of different cross-section, the diametrically opposite pair 36 serving as guideways, and the diametrically opposite slots 66 providing clearance for the arms 67.

It should further be noted that the control element 38 reaches through a central hole 68 provided in the hub 30 of spider 26, and that the hole 68 has a minimum opening at its center 70, and is tapered or flared towards both ends 71. These ends have a distance from one another smaller than the diameter of the rollers 25.

While the roller axis 34 stays in the bisector plane 37 that coincides with the central plane of rotation of the control element 38, the plane of the spider 26, and of the axes of its journals, swings out of bisector plane 37 in operation, about axis 34. The spider 26 tilts back and forth with respect to plane 37. More clearance is required at the ends 71 than at the center 70. The opposite taper shown provides that, and gives more strength than a cylindrical hole of the larger diameter at the ends 71.

Figure 3:
Fig. 3 is a cross-section like Fig. 2, but showing only part of the control element 38", looking left in Fig. 1, towards the ball joint.
Figure 8:
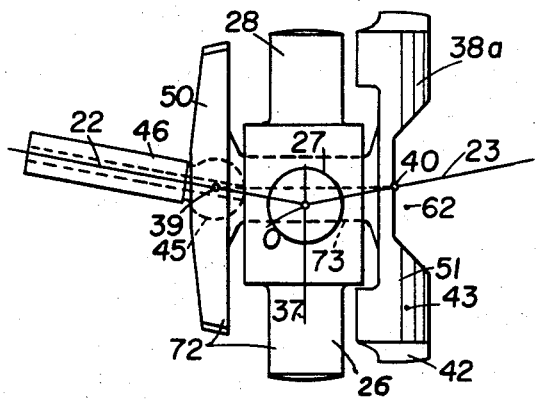
Fig. 8 is a side view of a control element that is interlocked with a spider and inseparable therefrom without destruction, and that may be substituted for the more conventional and separable control element shown in Fig. 1.

While Figures 1 and 3 show the control element 38 made up of two parts 38', 38" rigidly secured together, I preferably use a single integral element in a more novel way. Preferably its material is a non-metal which can be moulded at relatively moderate temperature, as for instance some known nylon or nylon compounds and similar materials. The element is moulded right through the spider. The unit 72, Fig. 8, of spider 26 and control element 38a is inseparable without destruction. The ball end 45 of rod 46 may also be moulded to unit 72. The ball end may be first coated to avoid seizure.

A moulding difficulty is to be overcome at the central connecting stem 73 of element 38a. Here, inside the hole 68, the mould is not retractable. Inside hole 68 I may use a sleeve of sand or clay similar to those used in casting, or of other destructible material. To attain sufficient strength this sleeve is supported on both sides by the rigid parts of the mould proper. Being supported all around the circumference by the wall of hole 68 and at both ends by the rigid mould, this destructible sleeve part remains practically without bending stresses. It is exposed only to compressive stresses. These it is capable to stand, as it transmits them directly to the supports.

After completed moulding operation the rigid mould is removed, and the sleeve is removed by destruction.

Except for the interlocked control element 38a in place of element 38, the embodiment is exactly the same as described.

Casting may also be used in place of moulding. When casting at high temperature the spider 26 may be cooled.

*Further embodiments*

Figure 10:
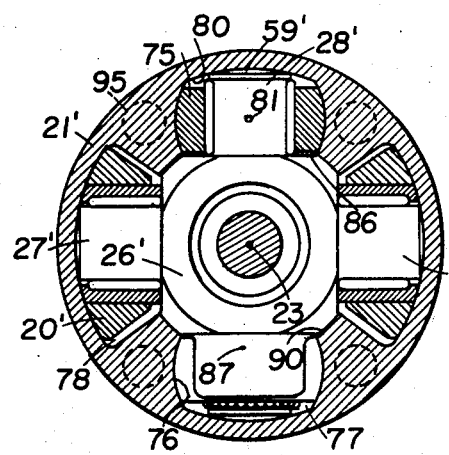
Fig. 10 is a cross-section corresponding to Fig. 9, showing the joint in alignment.
Figure 9:
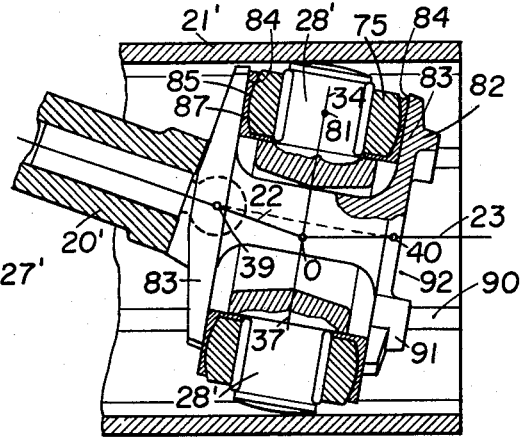
Fig. 9 is a fragmentary axial section of a modification, showing the universal joint at its largest angularity.
Figure 11:
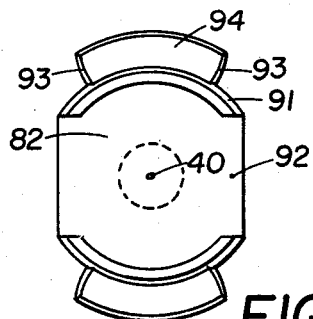
Fig. 11 is an end view of the control element, looking left in Fig. 9.
Figures 12, 13:
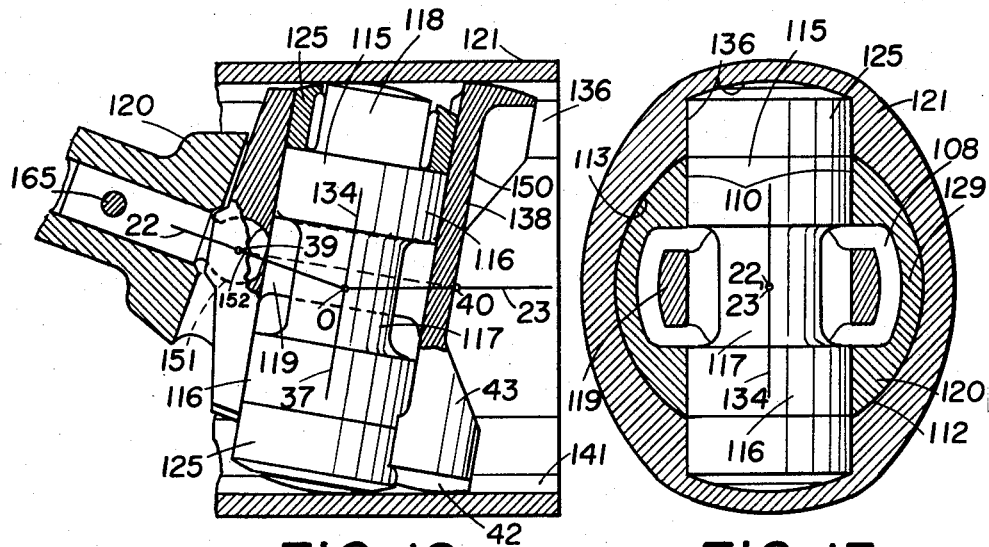
Fig. 12 is a fragmentary axial section of a further embodiment, showing the universal joint at angularity.
Fig. 13 is a cross-section corresponding to Fig. 12, showing the joint in alignment.
Figures 14, 15:
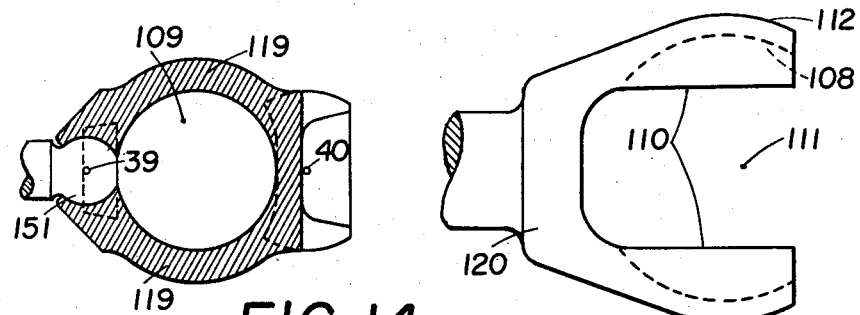
Fig. 14 is a section through the control element, taken along lines 39—40 of Fig. 12.
Fig. 15 is a side view of the inner or forked member 120 corresponding to Figs. 12 and 13.

The embodiment of Figures 9 to 11 uses spherical or ball-type rollers 75 rotatably mounted on the coaxial journal portions 28' of spider 26'. Its coaxial journal portions 27' are pivotally mounted on a fork member 20' similar to member 20. The spherical outside surfaces of the rollers 75 contact the cylindrical side surfaces 76 of ways 77 provided on the outer member 21'. Like member 21, member 21' encloses the rollers 75, the spider 26' and the forked part of member 20'. The ways 77 as well as the slots 78 extend parallel to the axis 23 of member 21'. The bottoms 80 of the ways lie in a cylindrical surface coaxial with axis 23. The outer end surfaces 59' of the journal portions 28' contact the bottoms 80 for centering.

The roller centers 81 and roller axis 34 are maintained in the bisector plane 37 by a control element 82, whose axis 39—40 is constrained to pass through two points 39, 40 lying respectively on the axes 22, 23 of the members 20', 21'. The points 39, 40 lie at opposite sides of the intersection point 0 of said axes, at equal distances from point 0. In other words the constraint of element 82 is analogous to the one of element 38. Element 82 itself is similar to element 38. It contains arms 83 reaching outwardly towards the rollers 75 to transmit pressure thereto. Its parallel plane sides 84 straddle the rollers.

A part 85 is preferably interposed between sides 84 and the rollers 75 to improve the intimacy of contact. Part 85 is in the form of a disk 86 extending about its journal portion 28' and containing two outwardly directed arms 87 which hug the outside surface of the respective roller 75. The portions contacting the spherical roller are parts of a concave spherical surface matching the outside surface of the roller. Its center coincides with the roller center 81 at all times. The opposite surface portions of part 85 are parallel planes contacting the plane sides 84 of the control element.

Control element 82 differs from element 38a or 38 in that it contacts a different inside cylindrical surface. This surface comprises the separated portions 90 of the cylindrical inside bore of outer member 21'. It is contacted by portions 91 that lie in a spherical surface on element 82. Its center is at 40. Portions 91 are separated by a gap or recess 92. They achieve centering in all radial directions because of the large angle covered by them. The sides 93 of the arm projections 94 are shaped to contact the sides 76 of the ways 77, as if the two projections 94 were teeth of a toothed coupling centered at 40 and adapted to operate at varying shaft angles. Thereby element 82 is suitably rotated.

Member 21' may be secured to a flange member similar to member 54, and not shown, by screws indicated in dotted lines 95 in Fig. 10. The screws thread into member 21'. A flexible seal like seal 64 may be bonded to outer member 21', as described with Fig. 1, and not shown over again.

Element 82 may be moulded to interlock with the spider 26', like element 38a, or made in two parts like member 38, if desired.

A still other embodiment will now be described with Figures 12 to 15. It has no spider member.

Torque is transmitted between an inner member 120 and an outer member 121 having axes 22, 23 respectively. These intersect at 0 and may include a varying angle with each other. The inner member 120 is forked (Fig. 15) and contains plane-sided ways 110 formed by a large slot 111. The ways 110 are parallel to its axis 22 insofar as their plane side surfaces are parallel thereto. At its widest portion member 120 contains an outside surface 112 which is essentially spherical, and which fits into the cylindrical bore 113 of outer member 121. The latter contains plane-sided parallel straight ways 136.

The two members 120, 121 are connected by a rolling part 115 which contains two spaced cylindrical roller surfaces 116. These can be considered a pair of coaxial rollers formed integral with each other. A stem 117 of smaller diameter connects the two surfaces 116. Rotatably mounted on outer journal portions 118 of part 115 are a pair of rollers 125. They have the same common axis 134 as the roller surfaces 116. The rollers 125 engage the ways 136 of the outer member 121, while the coaxial roller surfaces 116 engage the ways 110. Torque is transmitted between the members 120, 121 through the part 115 and the rollers 125.

To transmit constant velocity the centers of the rollers, that is their axis 134 is constrained to stay in the bisector plane 37. This constraint is accomplished by a control member 138 very similar to element 38a or 38, except that it has two central connecting portions 119 rather than a single stem 73. The portions 119 straddle the rolling part 115. No interlocking structure is here required, as the part 115 can be introduced through the hole 109 (Fig. 14) formed by portions 119.

Member 120 contains a circular recess 108 (Figs. 13, 15) to provide clearance for the portions 119. Thus member 120 has a varying wall thickness, which is smaller at 129 intermediate the ways 110 than at the portions adjoining said ways.

The axis 39—40 of the control element 138 is constrained to pass through two points 39, 40 lying respectively on the axes 22, 23 of the members 120, 121 at about equal distances from their intersection point 0. The support at point 39 is through a ball-end or external spherical portion 151 that is rigidly secured to member 120 as by a pin 165. An internal portion 152 provided on the control element 138 is in engagement with portion 151. Axis 39—40 of the control element is constrained to pass through point 40 through the contact of the spherical end portions 42 of arms 150 with the inside cylindrical surface 141 of the ways 136 and through the contact of the cylindrical surface 43 with the plane sides of the ways 136.

Figure 16:
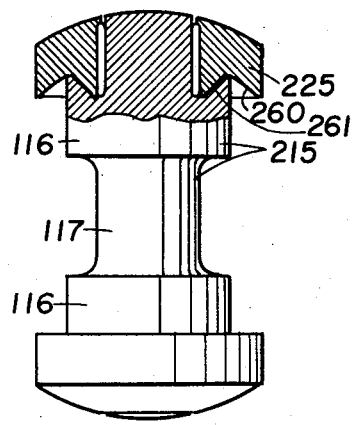
Fig. 16 is a side view, partly an axial section, of a modified rolling part.

Fig. 16 shows a modified rolling part 215 whose outer rollers 225 have a larger diameter than the roller surfaces 116. To attain maximum axial length of the surfaces 116, the inner end of each roller 225 comprises an internal spherical surface portion 260 joined by a hub portion 261. This rolling part may be used in place of part 115, when the ways for the rollers 225 are suitably widened.

Lubrication along known practice is used. It should also be understood that the rollers or ways may be eased-off or crowned if desired.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. A universal joint for transmitting torque comprising an inner member and an outer member whose axes intersect at an angle which may vary in operation, a plurality of rotatable parts carried by said inner member, said outer member enclosing said parts and containing ways for engagement with said parts, rotatable control means for maintaining the centers of said parts in the bisector plane of the axes of said two members, means constraining the axis of said control means to pass through two points lying respectively on the axes of said inner member and outer member at opposite side of the point of intersection of said axes, said constraining means comprising a plurality of separated portions of an inside cylindrical surface provided on said outer member, and portions of a convex spherical surface provided on said control means which engage said separated portions, said separated portions being adjacent the sides of said ways, said constraining means further comprising arms secured to said control means and extending into said ways opposite said rotatable parts for transmitting guiding pressure to said parts.

2. A universal joint according to claim 1, wherein the bottom surfaces of said ways are portions of an inside cylindrical surface coaxial with said outer member, and wherein said control element has generally radial arms extending into said ways and having end portions which are portions of a spherical surface centered on the axis of said control element and contacting said cylindrical surface.

3. A universal joint according to claim 2, wherein said rotatable parts are rollers having cylindrical working surfaces, wherein said ways are plane-sided ways and engage said rollers, and wherein said control element has a pair of diametrically opposite arms that have portions that lie in a common convex cylindrical surface whose axis is radial of the axis of said control element, said portions contacting the sides of said ways.

4. A universal joint for transmitting torque comprising an inner member and an outer member whose axes intersect at an angle which may vary in operation, a plurality of rotatable parts carried by said inner member, said outer member enclosing said parts and containing ways for engagement with said parts, rotatable control means forming a single rigid unit for maintaining the centers of said parts in the bisector plane of the axes of said two members, means for constraining the axis of said control means to pass through two points lying respectively on the axes of said inner member and outer member at opposite sides of the intersection point of said axes, the constraining means at said inner member being a ball portion and an internal part surrounding said ball portion and rigid with said control means.

5. A universal joint according to claim 4, wherein both of said two members contain ways whose side surfaces are parallel to their respective axes and wherein said ball portion is rigid with said inner member.

6. A universal joint according to claim 4, wherein said control means are a single control element whose axis is constrained to pass through two points lying respectively on the axes of said two members at opposite sides of and at equal distances from the intersection point of said axes, wherein said rotatable parts are rollers, and wherein said control element has arms extending into said ways and engaging said rollers to exert guiding pressure thereon from either side.

7. A universal joint according to claim 1, wherein the ways on said outer member are straight and parallel to the axis of said outer member, wherein said inner member is a forked member, and wherein there is a spider member pivotally mounted on said forked member, said spider member having a pair of coaxial journal portions on which said rotatable parts are mounted, said parts engaging said straight ways.

8. A universal joint for transmitting torque between an inner member and an outer member whose axes intersect at an angle which may vary in operation, comprising said two members, a spider member having four journal portions equally spaced about an axis and extending radially of said axis, said inner member being a forked member on which said spider member is pivotally mounted by a coaxial pair of said journal portions, a pair of rollers rotatably mounted on the other pair of journal portions of said spider member, said outer member enclosing said rollers and spider member and containing ways whose side surfaces are parallel to its axis, for engagement with said rollers, a rotatable control element for maintaining the axes of said rollers in the bisector plane of the axes of said two members, said control element having arms reaching into said ways to opposite sides of said rollers for exerting guiding pressure on said rollers, and means for constraining the axis of said control element to pass through two points of fixed distance lying respectively on the axes of said inner member and outer member at opposite sides of and at equal distances from the point of intersection of said axes, the constraining means at said outer member comprising a plurality of separated portions of an inside cylindrical surface provided on said outer member, said portions being adjacent the side surfaces of said ways and engaging portions of a convex spherical surface provided on said control means.

9. In a universal joint, in combination, a rotatable forked member, a spider member having two pairs of journal portions projecting outwardly from a central portion, the journal portions of each pair being coaxial, one pair of said journal portions being engaged with said forked member to pivotally mount said spider on said forked member, a pair of coaxial rollers rotatably mounted on the other pair of said journal portions, a rotatable outer member enclosing said spider member and rollers and containing ways for engagement with said rollers, and a control element for maintaining the axis of said rollers in the bisector plane of the axes of said forked member and outer member, said spider member having a hole centrally therethrough, and said control element passing through said hole and being inseparable from said spider member without destruction.

10. A universal joint for transmitting torque comprising an inner member and an outer member whose axes intersect at an angle which may vary in operation, a plurality of rolling parts carried by said inner member, said outer member enclosing said parts and containing ways for engagement with said parts, a rotatable control element for maintaining the centers of said parts in the bisector plane of the axes of said two members, means for constraining the axis of said control element to pass through two points lying respectively on the axes of said two members at opposite sides of and at about equal distances from the intersection point of said axes, said control element having projections extending into said ways and straddling said rolling parts, said projections having plane portions perpendicular to the axis of said control element for transmitting guiding pressure to said rolling parts.

11. A universal joint according to claim 10, wherein said plane portions transmit guiding pressure to said rolling parts through intermediate parts, said intermediate parts hugging the working surfaces of said rolling parts and having plane sides contacting with said plane portions.

12. A universal joint for transmitting torque between two members whose axes intersect at an angle which may vary in operation, comprising said two members, both of said members containing ways whose side surfaces are parallel to their respective axes, rolling means movable in said ways in engagement therewith to transmit torque between said two members, and a single control element for maintaining the centers of said rolling means in the bisector plane of said axes, said control element being supported at two points lying respectively on said axes at opposite sides of their intersection point, the support at each of said points being through a spherical surface centered at the respective point and provided on said control element, one of said spherical surfaces engaging a counterpart spherical surface rigid with one of said two members.

13. In a universal joint, in combination, a rotatable forked member, a spider member having two pairs of journal portions projecting outwardly from a central portion, the two journal portions of each pair being coaxial, said spider member being pivotally mounted on said forked member by means of one of said pairs of journal portions, a pair of parts rotatably mounted on the other pair of journal portions, a rotatable outer member enclosing said spider member and said parts and containing a pair of diametrically opposite ways provided internally therein for engagement with said parts, said outer member further containing a pair of diametrically opposite internal grooves extending parallel to its axis to provide space for the arms of said forked member, said grooves having a width increasing with increasing distance from the axis of said outer member, and a control element for maintaining the axis of said parts in the bisector plane of the axes of said forked member and outer member.

14. In a universal joint, in combination, a rotatable forked member, a spider member having two pairs of journal portions projecting outwardly from a central portion, the two journal portions of each pair being coaxial, said spider member being pivotally mounted on said forked member by means of one of said two pairs of journal portions, a pair of parts rotatably mounted on the other pair of journal portions, a rotatable outer member enclosing said spider member and said parts and containing a pair of diametrically opposite ways provided internally therein for engagement with said parts, and a control element for maintaining the axis of said parts in the bisector plane of the axes of said forked member and outer member, said control element extending through an opening in said central portion of the spider member, said opening being flared at both ends so that it has a larger diameter at said ends than at its middle portion.

15. A universal joint comprising an outer member and an inner member, said outer member having diametrally opposed ways extending parallel to its axis which have plane sides, said outer member also having internally-formed, cylindrical portions spaced about and extending in the direction of its axis, a third member pivotally mounted on said inner member having diametrally opposed cylindrical portions engaging the sides of said diametrally opposed ways, and a control element for maintaining the axis of said third member in the bisector plane of the axes of said outer and inner members, said control element being pivotally connected to said inner member, and engaging said diametrally opposed portions, said control element having spaced cylindrical portions engaging the sides of said diametrally opposed ways and having spaced spherical portions engaging said spaced cylindrical portions of said outer member.

16. A universal joint according to claim 15, wherein the bottoms of said diametrally disposed ways are cylindrical and are the spaced cylindrical portions of said outer member, and wherein the spaced spherical portions of said control element engage said bottoms.

References Cited in the file of this patent

UNITED STATES PATENTS

| | | |
|---|---|---|
| 2,211,388 | Salvetti | Aug. 13, 1940 |
| 2,352,776 | Dodge | July 4, 1944 |
| 2,427,237 | Suczek | Sept. 9, 1947 |
| 2,432,395 | Dunn | Dec. 9, 1947 |
| 2,551,779 | Wingquist | May 8, 1951 |